April 17, 1962 T. P. COSTELLO 3,030,532
CAPACITOR HOUSING FOR ELECTRIC MOTORS
Filed April 29, 1959 2 Sheets-Sheet 1

WITNESSES
Edwin E. Bassler
James F. Young

INVENTOR
Thomas P. Costello
BY F. P. Lyle
ATTORNEY

United States Patent Office 3,030,532
Patented Apr. 17, 1962

3,030,532
CAPACITOR HOUSING FOR ELECTRIC MOTORS
Thomas P. Costello, Lima, Ohio, assignor to Westinghouse Electric Corporation, East Pittsburgh, Pa., a corporation of Pennsylvania
Filed Apr. 29, 1959, Ser. No. 809,692
3 Claims. (Cl. 310—72)

The present invention relates to accessory housings for attachment to dynamoelectric machines, and more particularly to a capacitor housing for a capacitor type single phase motor.

Many single phase capacitor type motors require a metal cover or housing for the capacitor which is mounted on the motor frame or housing. The conventional arrangement is to assemble a suitable round capacitor in a drawn metal housing with an insulating disc attached to the inside of the metal housing on the same end as the terminals of the capacitor. A pad of rubber, or other resilient material, is generally located between the motor housing and the capacitor itself. The insulating disc prevents the capacitor terminals from grounding or shorting by making electrical contact with the capacitor housing, while the rubber pad prevents the capacitor from rattling or moving in the housing.

The conventional practice for capacitor motors is to use round capacitors of the soldered cover type of construction. This type of capacitor, however, is more expensive than capacitors of oval shape in cross section, with the cover attached and sealed by a rolled seam construction.

An oval shaped capacitor offers certain other advantages as well as lower cost. The capacitor housing can be reduced by as much as one-third in its height above the housing of the motor by using an oval capacitor. The oval capacitor thus provides a motor which requires less clearance, which is highly desirable in many applications such as direct connected fan drives since more space is available for deep pitch fans where the blading extends back over the motor. The reduced height of the capacitor housing also improves the appearance of the motor as well as reducing the space required for the motor.

Oval capacitors are made with rolled flange seams between the case and the cover of the capacitor. This seam is completely solderless, so that there is no chance of solder flux or other contaminants affecting the impregnant and capacitor performance, and the cost is less than soldered covers. However, the rolled seam or flange extends out about ⅛ inch all around the top of the case, making the width and height of the flange approximately ¼ inch greater than the corresponding dimensions of the case or body of the capacitor. Because of this extending flange and the non-uniform shape of the oval capacitor, it is apparent that difficulties arise in providing a capacitor housing capable of positively and economically securing the capacitor to the motor housing.

The principal object of my invention is to provide a capacitor housing for use with a single phase motor which will provide a simple, versatile and economical housing for an oval shaped capacitor.

Another object of my invention is to provide a capacitor housing for a single phase motor which eliminates the insulating disc and the pad of resilient material which have previously been used in capacitor housings but which positively holds the capacitor in position and prevents any risk of grounding or shorting the capacitor terminals.

Another object of my invention is to provide a capacitor housing which permits the use of oval capacitors and results in a motor of compact design and reduced overall height with improved appearance.

Further objects and advantages of my invention will be apparent from the following detailed description, taken in conjunction with the accompanying drawing, in which.

Figure 1:
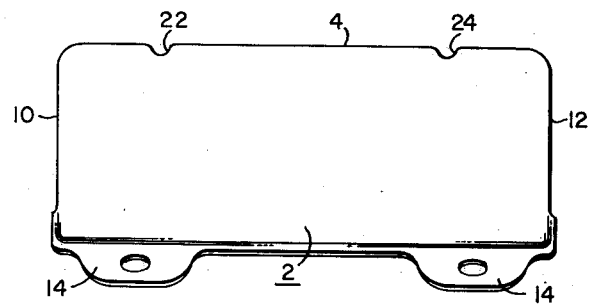
FIGURE 1 is a side view of a capacitor housing embodying my invention.
Figure 2:
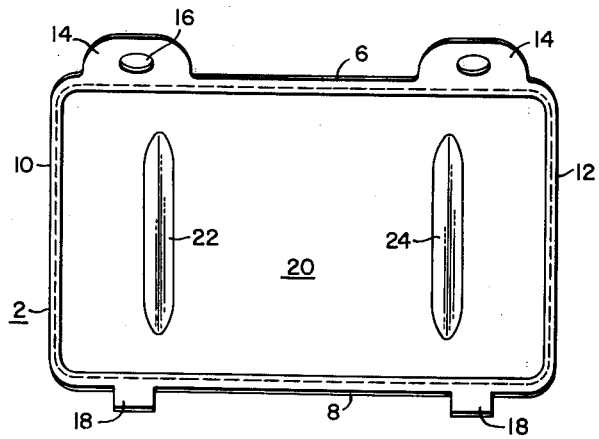
FIG. 2 is a bottom view of the housing of FIG. 1.

A preferred embodiment of the invention is illustrated in the drawing. As there shown, a capacitor housing 2 is provided having a top portion 4, side portions 6 and 8, and end portions 10 and 12. The housing 2 may be drawn, or otherwise formed, from sheet metal. The side portion 6 has tabs 14 spaced apart and angularly disposed outwardly from the side 6. The tabs 14 each have an opening 16 therethrough providing means for a screw or other suitable means for attaching the housing 2 to the motor. The opposite side portion 8 has a pair of tabs 18, spaced apart, and extending angularly outwardly from the side 8. The tabs 14 and 18 are adapted to the curvature of the motor housing on which the capacitor housing is to be mounted. The top portion 4 has an inner surface 20 which has a pair of embossments indicated at 22 and 24, spaced apart, and extending inwardly from the inner surface of the top portion 4 of the capacitor housing 2. The embossments 22 and 24 extend transversely of the capacitor housing, as shown.

Figure 4:
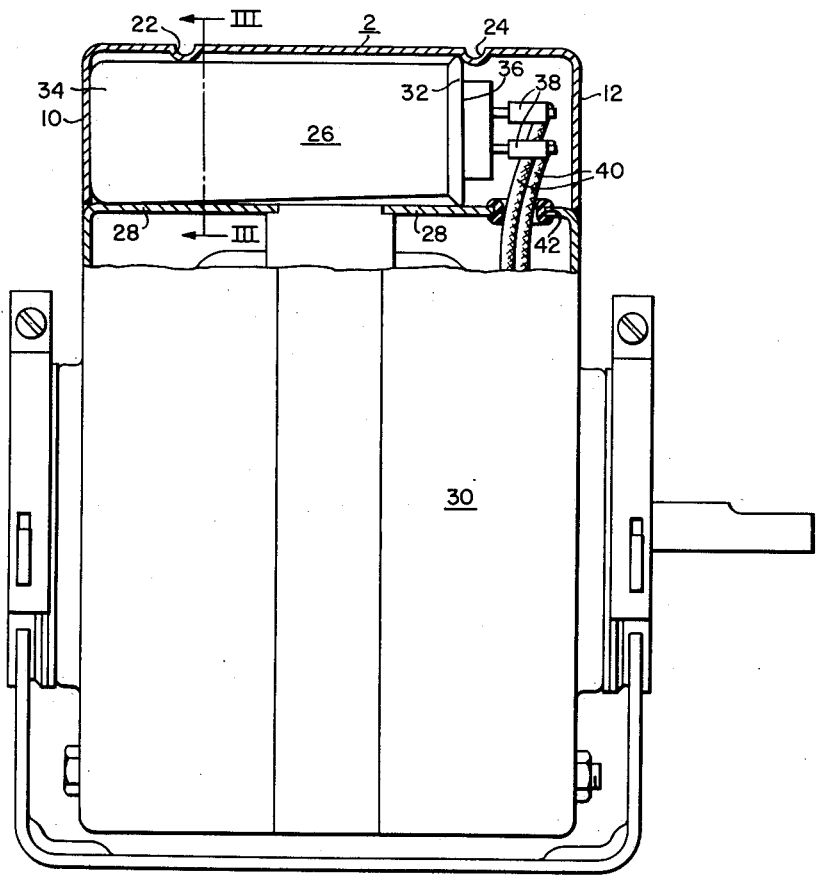
FIG. 4 is a side elevation view, partly in section, of a single phase capacitor type motor embodying my invention.

Referring to FIG. 4, the capacitor housing 2 is shown containing a capacitor 26 and attached to the housing 28 of a single phase capacitor type motor 30 which may be of any suitable or usual construction. The capacitor 26 is of the oval construction previously mentioned and has a rolled flange seam 32 between the case 34 and the cover 36. The capacitor 26 has terminals 38 which are connected to the motor windings by conductors 40 passing through an opening 42 in the motor housing.

Figure 3:
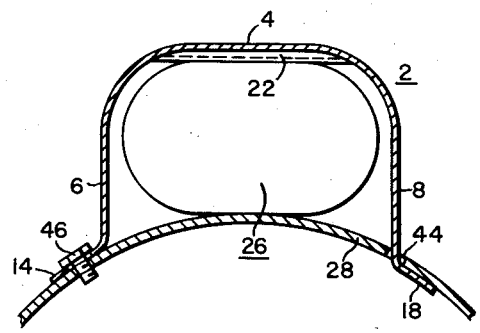
FIG. 3 is a sectional view taken substantially along the line III—III of FIG. 4.

As explained previously, the housing 2 is intended to permit the use of a capacitor 26 of oval shape in cross section, and the top portion 4 of the housing is therefore made substantially flat, as shown in FIG. 3, so that the housing conforms generally to the shape of the capacitor.

In accordance with my invention, in order to adequately secure the capacitor 26 against the outer surface of the motor housing 28, the embossment 22 in the top of the housing 2 is made of proper height to compensate for the difference in width between the case 34 of the capacitor and the rolled flange 32. The embossment 22 thus abuts the case 34 and holds it against the outer surface of the motor housing 28 when the capacitor housing 2 is secured in place. In this manner, the embossment 22 positively holds the capacitor in place and prevents it from moving or rattling within the housing 2 eliminating the need for a resilient pad between the capacitor and motor.

The other embossment 24 is positioned, with respect to the capacitor 26, so that if the rolled flange 32 of the capacitor is not in proper position, the capacitor housing 2 will be unable to seat on the motor housing 28. The position and height of the embossment 24 are such that when the capacitor is properly positioned the embossment engages in front of the flange 32, as shown in FIG. 4, and prevents the capacitor from shifting forward in the housing 2. Thus, the terminals 38 are prevented from making electrical contact with the housing 2 which would cause grounding or shorting of the terminals. The embossment 24 holds the capacitor 26 against the opposite end 10 of the capacitor housing 2 and ensures the safe positioning of the capacitor 26 so that the electrical terminals 38 have maximum electrical clearance. In this manner, the need for an insulating disc inside the capacitor housing 2 is eliminated, and the embossments positively hold the capacitor in proper position.

Referring to FIG. 3, the capacitor housing 2 is secured to the motor housing 28 by means of the tabs 14 and 18. The tabs 18 are angularly disposed from the side portion 8 and, when the capacitor housing 2 is mounted in place, they extend through slots 44 in the motor housing 28 and engage the inner surface of the motor housing. When the tabs 18 are inserted in the slots 44, the capacitor housing 2 can be seated with the tabs 14 lying against the outer surface of the motor housing 28. The tabs 14 are secured to the motor housing by screws 46, or any suitable securing means.

The capacitor housing 2 will not seat on the motor housing 28 unless the capacitor 26 is properly positioned within the capacitor housing 2. In order to accomplish this, the embossment 24 is located so that if the rolled flange 32 of the capacitor is not in the correct position, it will be directly under the embossment 24, preventing the capacitor housing 2 from seating on the motor housing 28.

The axial width of the embossment 24 is made approximately equal to twice the clearance distance between the ends of the terminals 38 and the inside surface of the end 12 of the housing. If the flange 32 of the capacitor should be positioned near the highest point of the embossment 24, the housing 2 could not be drawn down unless the flange 32 could ride down the correct side of the embossment 24 which would result in properly positioning the capacitor. If the flange 32 should be positioned on the wrong side of the embossment 24, the action of drawing the housing 2 down onto the motor housing 28 will tend to move the capacitor forward due to the contour of the embossment, so that the terminals 38 will contact the adjacent end of the housing before the flange 32 can engage the inner surface 20 of the top portion 4. This action will prevent the capacitor housing from seating on the motor housing. Thus, the embossment prevents improper positioning of the capacitor and ensures that it is properly located before the housing 2 can be attached to the motor.

It should now be apparent that my invention enables the use of oval capacitors, which in most cases are less expensive than other capacitors of different shapes, although it will be obvious that, in its broader aspects, the invention is not limited to the use of oval capacitors. The height of the capacitor housing above the motor is greatly reduced, as compared to conventional housings, thereby providing more clearance space for the motor, and providing reduced mounting space for the motor. The capacitor housing provides maximum versatility by allowing the capacitor to be located with its electrical terminals adjacent either end of the motor or housing, by properly locating both embossments, and a more compact and improved appearance is obtained than with conventional designs. The tooling costs and cost per housing are considerably reduced due to the reduced depth of the draw necessary to form the housing which can be accomplished in one machine operation. The invention also eliminates the conventional insulation disc and rubber pad previously required to position and insulate the capacitor, thus reducing both material and labor costs.

A particular embodiment of the invention has been described with a certain degree of particularity for the purpose of illustration, but it is to be understood that this embodiment has been described only by way of example and that numerous changes and other embodiments are possible without departing from the spirit and scope of the invention.

I claim as my invention:

1. An electric motor having a housing, a capacitor having terminals at one end thereof, a capacitor housing secured to the motor housing and extending longitudinally thereof, said capacitor being disposed in the capacitor housing, and the capacitor housing having a first portion projecting inwardly from the top thereof to engage the capacitor and hold it against the motor housing and having a second portion projecting inwardly from the top thereof to engage an end of the capacitor and position it with said terminals spaced away from the adjacent end of the capacitor housing.

2. An electric motor having a housing, a capacitor of generally oval shape in cross section and having terminals at one end thereof, a capacitor housing secured to the motor housing and extending longitudinally thereof, the capacitor housing having a substantially flat top surface and said capacitor being disposed in the capacitor housing, and the capacitor housing having a first transverse portion of its top surface projecting inwardly to engage the capacitor and hold it against the motor housing and having a second transverse portion of its top surface projecting inwardly to engage an end of the capacitor and position it with said terminals spaced away from the adjacent end of the capacitor housing.

3. An electric motor having a housing, a capacitor of generally oval shape in cross section and having terminals at one end thereof, said capacitor having an extending flange at the end adjacent the terminals, a capacitor housing secured to the motor housing and extending longitudinally thereof, the capacitor housing having a substantially flat top surface and said capacitor being disposed in the capacitor housing, and the capacitor housing having a first transverse portion of its top surface projecting inwardly to a distance at least as great as the height of said flange to engage the capacitor and hold it against the motor housing and having a second transverse portion projecting inwardly in position to engage the end of the capacitor adjacent the terminals, the width of the second transverse portion being greater than the desired spacing between the terminals and the adjacent end of the capacitor housing.

References Cited in the file of this patent

UNITED STATES PATENTS

| | | |
|---|---|---|
| 2,219,495 | Sleeter et al. | Oct. 29, 1940 |
| 2,253,405 | Veinott | Aug. 19, 1941 |
| 2,460,903 | Peck | Feb. 8, 1949 |
| 2,683,824 | Carville et al. | July 13, 1954 |
| 2,709,761 | Potter | May 31, 1955 |
| 2,748,185 | Brunke | May 29, 1956 |
| 2,811,657 | Mollenberg | Oct. 29, 1957 |